US012586860B2

(12) United States Patent
Yang et al.

(10) Patent No.:  US 12,586,860 B2
(45) Date of Patent:  Mar. 24, 2026

(54) BATTERY CELL, BATTERY, ELECTRICAL DEVICE, METHOD AND EQUIPMENT FOR MANUFACTURING BATTERY CELLS

(71) Applicant: Jiangsu Contemporary Amperex Technology Limited, Changzhou (CN)

(72) Inventors: Jianxiong Yang, Changzhou (CN); Siying Huang, Changzhou (CN); Zhijun Guo, Changzhou (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 675 days.

(21) Appl. No.: 18/048,838

(22) Filed: Oct. 22, 2022

(65) Prior Publication Data

US 2023/0059831 A1      Feb. 23, 2023

Related U.S. Application Data

(63) Continuation of application No. PCT/CN2021/084978, filed on Apr. 1, 2021.

(51) Int. Cl.
*H01M 50/342* (2021.01)
*H01M 50/148* (2021.01)
*H01M 50/204* (2021.01)

(52) U.S. Cl.
CPC ....... *H01M 50/342* (2021.01); *H01M 50/148* (2021.01); *H01M 50/204* (2021.01); *H01M 2220/20* (2013.01); *H01M 2220/30* (2013.01)

(58) Field of Classification Search
CPC ............. H01M 50/342; H01M 50/204; H01M 50/148; H01M 2220/20; H01M 2220/30
See application file for complete search history.

(56) References Cited

U.S. PATENT DOCUMENTS

2017/0279098 A1     9/2017  Lee
2022/0123417 A1*    4/2022  Huang ................ H01M 50/271

FOREIGN PATENT DOCUMENTS

CN          203218359 U     9/2013
CN          104009196 A     8/2014
(Continued)

OTHER PUBLICATIONS

International Search Report and Written Opinion received in PCT Application PCT/CN2021/084978 on Jan. 4, 2022.
(Continued)

*Primary Examiner* — Nicole M. Buie-Hatcher
*Assistant Examiner* — Taylor Harrison Krone
(74) *Attorney, Agent, or Firm* — K&L Gates LLP

(57)          ABSTRACT

A battery cell, a battery, an electrical device, and a method and equipment for manufacturing battery cells are provided. In some embodiments, the battery cell includes a casing, a pressure-relief mechanism and a protective part. The casing has a wall portion. The pressure-relief mechanism is provided on the wall portion. The pressure-relief mechanism includes a weak portion and a first portion and a second portion provided on two sides of the weak portion. The weak portion is used to connect the first portion and the second portion, and the pressure-relief mechanism is configured in such a way that the weak portion is broken to release pressure when the pressure in the casing reaches a threshold value. The protective part is arranged on the pressure-relief mechanism, and the protective part is used to connect the first portion and the second portion to increase strength of connection between the first portion and the second portion.

20 Claims, 7 Drawing Sheets

(56)                    References Cited

FOREIGN PATENT DOCUMENTS

| CN | 104009196 | B |   | 4/2018 |   |   |
|----|-----------|---|---|--------|---|---|
| CN | 109390504 | A |   | 2/2019 |   |   |
| CN | 209592092 | U |   | 11/2019 |   |   |
| CN | 209880668 | U | * | 12/2019 | .......... | H01M 50/271 |
| CN | 211208540 | U |   | 8/2020 |   |   |
| CN | 112467300 | A |   | 3/2021 |   |   |
| CN | 213546446 | U |   | 6/2021 |   |   |
| DE | 102016215337 | A1 | * | 2/2018 | .......... | H01M 4/0404 |
| JP | H04349342 | A |   | 12/1992 |   |   |
| KR | 20120093253 | A |   | 8/2012 |   |   |

OTHER PUBLICATIONS

The first Office Action received in corresponding Chinese Application 202110354088.7 on May 12, 2021.
The extended European Search Report received in the corresponding European Application 21921641.3, mailed Mar. 20, 2023, 7 pages.

* cited by examiner

<u>1</u>

<u>10</u>

20

30

30

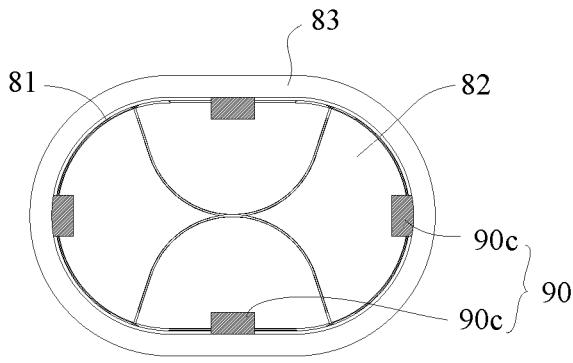
FIG. 14
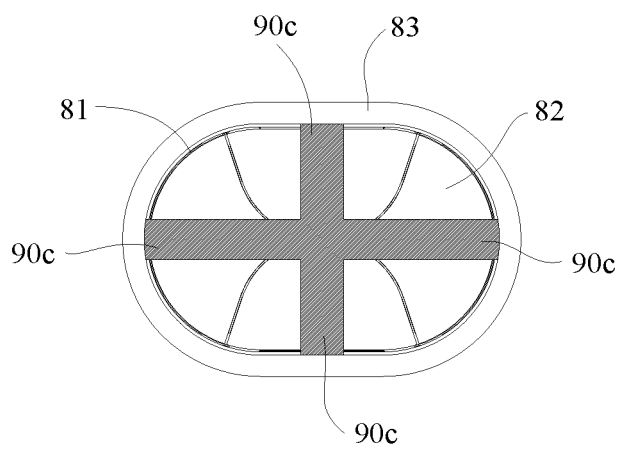
FIG. 15
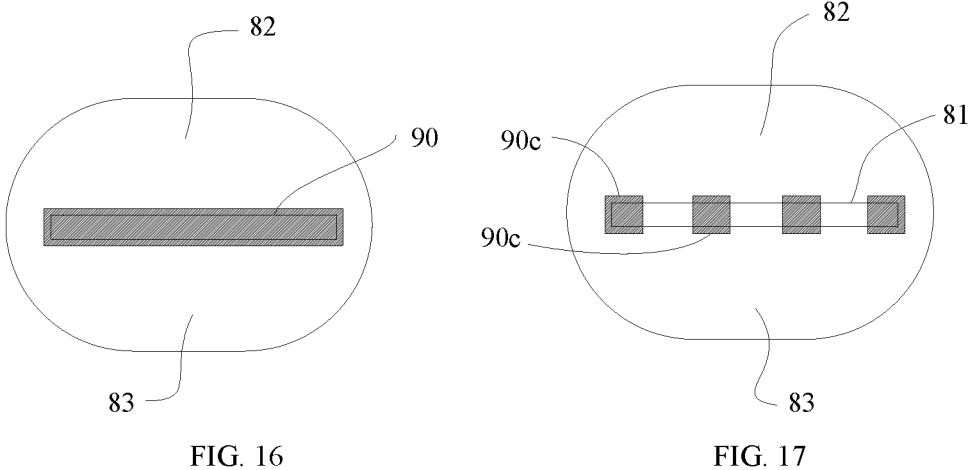
FIG. 16                    FIG. 17

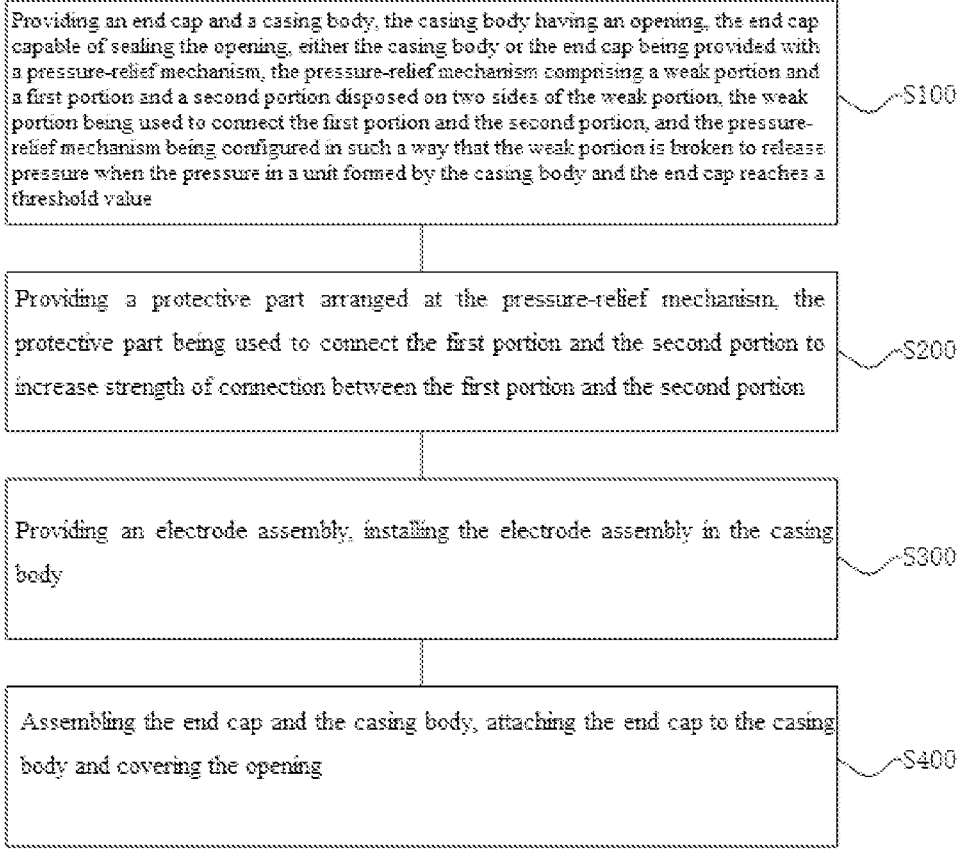

Providing an end cap and a casing body, the casing body having an opening, the end cap capable of sealing the opening, either the casing body or the end cap being provided with a pressure-relief mechanism, the pressure-relief mechanism comprising a weak portion and a first portion and a second portion disposed on two sides of the weak portion, the weak portion being used to connect the first portion and the second portion, and the pressure-relief mechanism being configured in such a way that the weak portion is broken to release pressure when the pressure in a unit formed by the casing body and the end cap reaches a threshold value ⌐S100

Providing a protective part arranged at the pressure-relief mechanism, the protective part being used to connect the first portion and the second portion to increase strength of connection between the first portion and the second portion ⌐S200

Providing an electrode assembly, installing the electrode assembly in the casing body ⌐S300

Assembling the end cap and the casing body, attaching the end cap to the casing body and covering the opening ⌐S400

FIG. 18

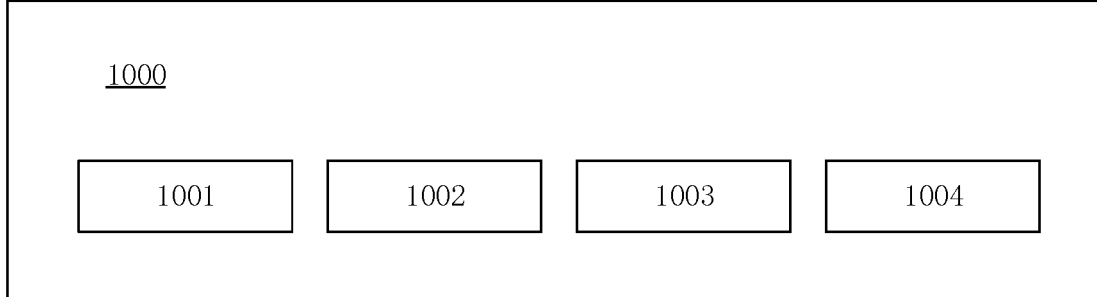

1000

| 1001 | 1002 | 1003 | 1004 |

FIG. 19

BATTERY CELL, BATTERY, ELECTRICAL DEVICE, METHOD AND EQUIPMENT FOR MANUFACTURING BATTERY CELLS

CROSS REFERENCE OF RELATED APPLICATIONS

This application is a continuation of International Application PCT/CN2021/084978, filed Apr. 1, 2021, and entitled "BATTERY CELL, BATTERY, ELECTRICAL DEVICE, METHOD AND EQUIPMENT FOR MANUFACTURING BATTERY CELLS", which is incorporated herein by reference in its entity.

TECHNICAL FIELD

The present disclosure relates to the technical field of batteries, in particular to a battery cell, a battery, an electrical device, and a method and equipment for manufacturing battery cells.

BACKGROUND

Batteries which can perform charge-discharge cycles have advantages of high energy densities, high power densities, a great many cycling times, a long storage period, etc., and therefore are widely applied to battery electric vehicles, mobile equipment or electric tools. A battery includes a plurality of battery cells in series connection, parallel connection or serial-parallel connection. In use of the battery, the battery cell has a risk of pressure-relief blasting when thermal runaway does not occur, affecting the proper use of the battery.

SUMMARY

The present disclosure provides a battery cell, a battery, an electrical device, and a method and equipment for manufacturing battery cells, aims to solve the problem of pressure-relief blasting when the battery cell is not in thermal runaway.

On the one hand, according to an embodiment of the present disclosure, a battery cell is provided, including a casing, where the casing has a wall portion; a pressure-relief mechanism, where the pressure-relief mechanism is arranged on the wall portion, the pressure-relief mechanism includes a weak portion and a first portion and a second portion which are arranged on two sides of the weak portion, the weak portion is used to connect the first portion and the second portion, and the pressure-relief mechanism is configured in such a way that the weak portion is broken to release pressure when the internal pressure of the casing reaches a threshold value; and a protective part, where the protective part is arranged on the pressure-relief mechanism, and the protective part is used to connect the first portion and the second portion to increase the strength of connection between the first and the second portion.

For the battery cell provided according to the embodiment of the present disclosure, the weak portion is arranged on the pressure-relief mechanism, such that pressure can be released when the internal pressure of the casing reaches the threshold value, ensuring safety when the battery cell is in thermal runaway. The protective part arranged can increase the strength of connection between the first portion and the second portion, such that when the internal pressure of the battery cell rises and drops alternatively, the protective part can share an acting force applied to the weak portion when the pressure-relief mechanism bulges or recesses to help reduce alternating stresses borne by the weak portion and minimize the possibility of advanced pressure-relief blasting of the pressure-relief mechanism caused by alternating fatigue aging or breakage of the weak portion when the battery cell is in normal use, thereby facilitating enhancement of the use safety and stability of the battery cell.

According to one aspect of the present disclosure, the protective part is further configured to change in physical properties when the internal pressure of the casing reaches the threshold value so as to reduce or remove the force of connection of the protective part to the first portion or the second portion.

In the above-mentioned solution, the protective part is further configured to change in physical properties when the internal pressure of the casing reaches the threshold value to reduce or remove the force of connection of the protective part to the first portion or the second portion, such that the weak portion of the pressure-relief mechanism can be broken in time to release pressure when the battery cell is in thermal runaway.

According to one aspect of the present disclosure, the weak portion is formed by forming a groove on an outer surface of the pressure-relief mechanism, and a thickness of the weak portion is smaller than a thickness of the first portion and a thickness of the second portion.

In the above-mentioned solution, the way that the groove is formed on the outer surface of the pressure-relief mechanism to form the weak portion helps formation of the weak portion and makes the strength of the weak portion lower than the strength of the first portion and the strength of the second portion, effectively ensuring that the weak portion can be broken in time when the battery cell is in thermal runaway.

According to one aspect of the present disclosure, the protective part is at least partly accommodated in the groove; the protective part is used to connect groove walls of the groove; and the protective part is configured to switch from a cured state into a softened state or from a cured state into a melted state when the internal pressure of the casing reaches the threshold value.

In the above-mentioned solution, accommodating the protective part in the groove helps formation of the protective part and can meet the demand for connection between the first portion and the second portion. Meanwhile, as the protective part switches from the cured state into the softened state or from the cured state into the melted state when the internal pressure of the casing reaches the threshold value, the strength of connection between the first portion and the second portion can be reduced, such that the first portion and the second portion have relatively great deformation when the battery cell is in thermal runaway, facilitating breakage of the weak portion to release pressure.

According to one aspect of the present disclosure, the protective part includes a main body portion and a first connecting portion and a second connecting portion which are located on two sides of the main body portion along a width direction of the groove; the main body portion is accommodated in the groove and is used to connect the groove walls of the groove; the first connecting portion is used to connect the first portion, and the second connecting portion is used to connect the second portion.

In the above-mentioned solution, the protective part, including the main body portion and the first connecting portion and the second connecting portion which are located on two sides of the main body portion along the width direction of the groove, can be connected to the first portion and the second portion through the main body portion, and can be connected to the first portion through the first connecting portion and to the second portion through the second connecting portion, enhancing the reliability of connection between the first portion and the second portion, and ensuring the strength of connection between the first portion and the second portion when the battery cell is not in thermal runaway.

According to one aspect of the present disclosure, the melting point of the protective part is lower than the melting point of the pressure-relief mechanism.

In the above-mentioned solution, since the melting point of the protective part is lower than the melting point of the pressure-relief mechanism, the protective part is melted or softened prior to the pressure-relief mechanism when the battery cell is in thermal runaway, reducing or removing the force of connection of the protective part to the first portion or the second portion, and helping breakage of the weak portion to release pressure.

According to one aspect of the present disclosure, the protective part includes at least one of a polypropylene membrane layer, a polyethylene membrane layer and a paraffin membrane layer.

In the above-mentioned solution, the protective part uses the above-mentioned membrane layer structure, such that the protective part can change in physical properties when the battery cell is in thermal runaway, further facilitating breakage of the weak portion to release pressure.

According to one aspect of the application, the protective part includes a basal layer and a binding layer which are laminated; the binding layer is used to connect the basal layer and the pressure-relief mechanism; and the binding layer is used to switch from a viscous state into a non-viscous state when the internal pressure of the casing reaches the threshold value.

In the above-mentioned solution, the binding layer is switched from the viscous state into the non-viscous state when the battery cell is in thermal runaway to reduce or remove the force of connection of the protective part to the first portion or the second portion, facilitating breakage of the weak portion to release pressure when the battery cell is in thermal runaway.

According to one aspect of the application, the protective part covers the groove along the width direction of the groove, and the protective part is respectively connected to the first portion and the second portion along the width direction of the groove.

In the above-mentioned solution, to facilitate connection of the protective part to the first portion and to the second portion, the protective part can be directly connected to the first portion and the second portion by means of, for example, pasting.

According to one aspect of the present disclosure, the weak portion is an annular structure; the first portion is located in an area surrounded by the weak portion and is used to turn after the weak portion is broken, and the second portion is located between the weak portion and the wall portion, and is used to connect the wall portion;

or, the weak portion is a strip structure, and the first portion and the second portion are both used to connect the wall portion.

In the above-mentioned solution, the weak portion of the above-mentioned structure is good for formation of the weak portion, the first portion and the second portion, and meanwhile can ensure that the weak portion can be broken when the battery cell is in thermal runaway to ensure safety of the battery cell.

According to one aspect of the present disclosure, the protective part has two or more protective units, and the two or more protective units are distributed at an interval on an extending trajectory of the weak portion.

In the above-mentioned solution, the weak portion with two or more protective units can not only meet the demand for an increase in the strength of connection to the first portion and the second portion when the battery cell runs properly, but also facilitate breakage of the battery cell when the battery cell is in thermal runaway, ensuring safety of the battery cell.

According to one aspect of the present disclosure, the protective part completely covers the weak portion along the extending trajectory of the weak portion.

According to one aspect of the present disclosure, the casing has a casing body and an end cap; the casing body has an opening; the end cap is configured to seal the opening; and either the casing body or the end cap has a wall portion.

In the above-mentioned solution, the assembling of units within the battery cell is facilitated, and safety is ensured when the battery cell is in thermal runaway.

According to one aspect of the present disclosure, the wall portion has a through-hole; the pressure-relief mechanism covers the through-hole; and the second portion is connected to an inner wall surface of the wall portion.

In the above-mentioned solution, the assembling and connection between the protective part and the casing is facilitated, and safety is ensured when the battery cell is in thermal runaway.

On the other hand, according to an embodiment of the present disclosure, a battery is provided, including the above-mentioned battery cell.

Further on the other hand, according to an embodiment of the present disclosure, an electrical device is provided, including the above-mentioned battery which supplies electricity.

More further on the other hand, according to an embodiment of the present disclosure, a method for manufacturing battery cells is provided, including:

providing an end cap and a casing body, where the casing has an opening, the end cap is configured to be capable of sealing the opening, either the casing body or the end cap is provided with a pressure-relief mechanism, the pressure-relief mechanism includes a weak portion and a first portion and a second portion which are arranged on two sides of the weak portion, the weak portion is used to connect the first portion and the second portion, and the pressure-relief mechanism is configured in such a way that the weak portion is broken to release pressure when the pressure in a unit formed by the casing body and the end cap reaches a threshold value;

providing a protective part, where the protective part is arranged at the pressure-relief mechanism, and the protective part is used to connect the first portion and the second portion to increase the strength of connection between the first portion and the second portion;

providing an electrode assembly, where the electrode assembly is installed in the casing body; and assembling the end cap and the casing body, where the end cap is connected to the casing body and covers the opening.

According to another aspect of the embodiment of the present disclosure, the step of providing a protective part, where the protective part is arranged at the pressure-relief mechanism, the protective part is used to connect the first portion and the second portion to increase the strength of connection between the first portion and the second portion, includes:

pasting the protective part in an area, with the weak portion, of the end cap or the casing body, where the protective part includes at least one of a polypropylene membrane layer and a polyethylene membrane layer; or, spraying protective powder onto the area, with the weak portion, of the end cap or the casing body, and allowing the protective powder to cure to form the protective part, where the protective powder includes at least one of polypropylene powder and polyethylene powder; or, soaking the area, with the weak portion, of the end cap or the casing body in a paraffin solution and allowing the paraffin solution on the area with the weak portion to cure to form the protective part.

More further on the other hand, according to an embodiment of the present disclosure, equipment for manufacturing battery cells is provided, including a first provision module for providing an end cap and a casing body, where the casing body has an opening, the end cap is configured to be capable of sealing the opening, either the casing body or the end cap is provided with a pressure-relief mechanism, the pressure-relief mechanism includes a weak portion and a first portion and a second portion which are arranged on two sides of the weak portion, the weak portion is used to connect the first portion and the second weak portion, and the pressure-relief mechanism is configured in such a way that the weak portion is broken to release pressure when the pressure in a unit formed by the casing body and the end cap reaches a threshold value; a second provision module for providing a protective part, where the protective part is arranged on the pressure-relief mechanism, the protective part is used to connect the first portion and the second portion to increase the strength of connection between the first portion and the second portion; a third provision module for providing an electrode assembly, where the electrode assembly is installed in the casing body; and a assembling module for assembling the end cap and the casing body, where the end cap is connected to the casing body and covers the opening.

For the battery cell manufactured using the equipment for manufacturing battery cells according to the embodiment of the present disclosure, due to the weak portion arranged on the pressure-relief mechanism, pressure can be released when the pressure in the casing body reaches the threshold value, ensuring safety when the battery cell is in thermal runaway. The protective part is arranged to increase the strength of connection between the first portion and the second portion, such that when the internal pressure of the battery cell rises and drops alternatively, the protective part can share an acting force applied to the weak portion when the pressure-relief mechanism bulges or recesses to help reduce the alternating stresses borne by the weak portion and minimize the possibility of advanced pressure-relief blasting of the pressure-relief mechanism caused by alternating fatigue aging or breakage of the weak portion, facilitating enhancement of the use safety and stability of the battery cell.

BRIEF DESCRIPTION OF DRAWINGS

To more clearly describe the technical solutions of the embodiments of the present disclosure, the accompanying drawings used in the embodiments of the present disclosure will be described briefly below. Apparently, the described accompanying drawings are merely part of embodiments of the present disclosure. Based on the accompanying drawings, other accompanying drawings can be obtained by those ordinarily skilled in the art without creative labor.

Figure 1:
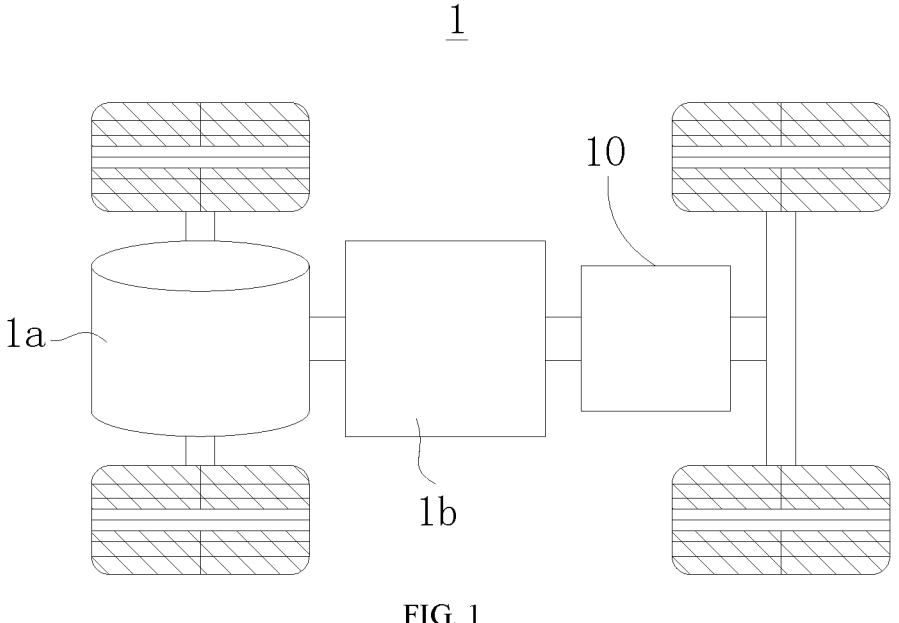
Figure 2:
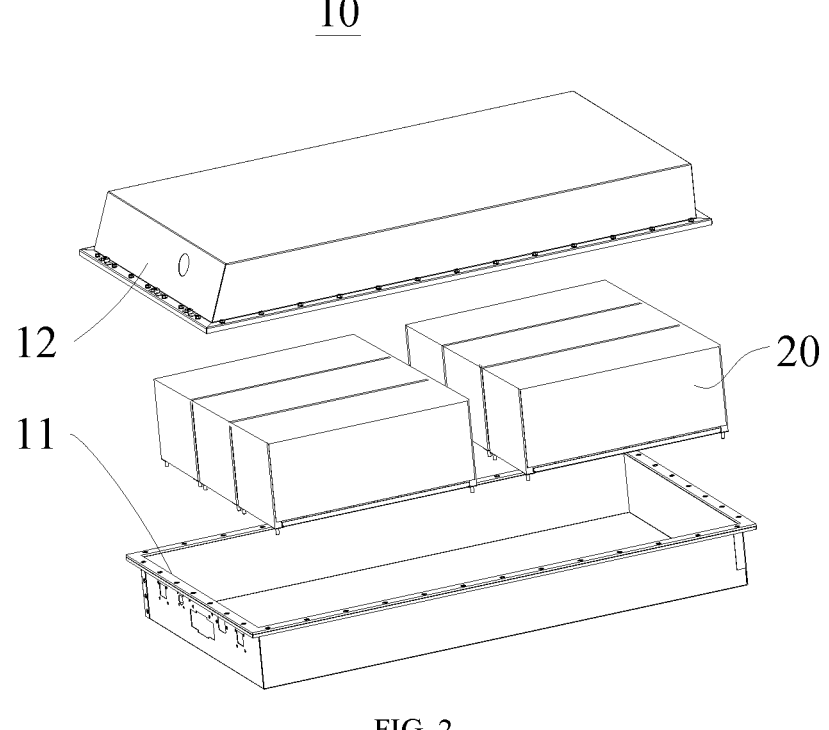
Figure 3:
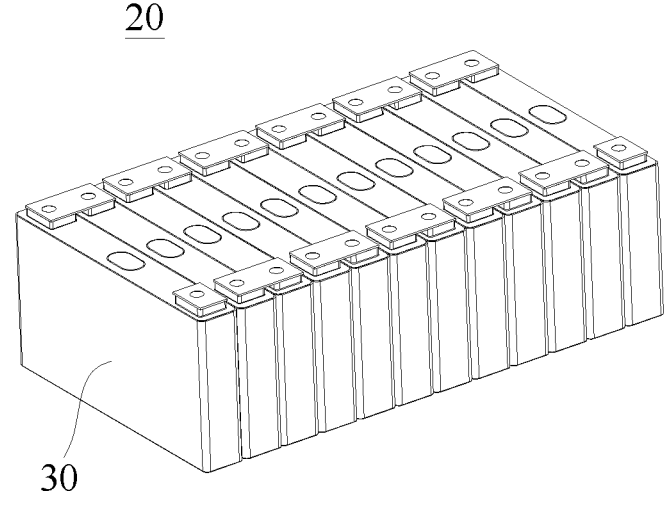
Figure 4:
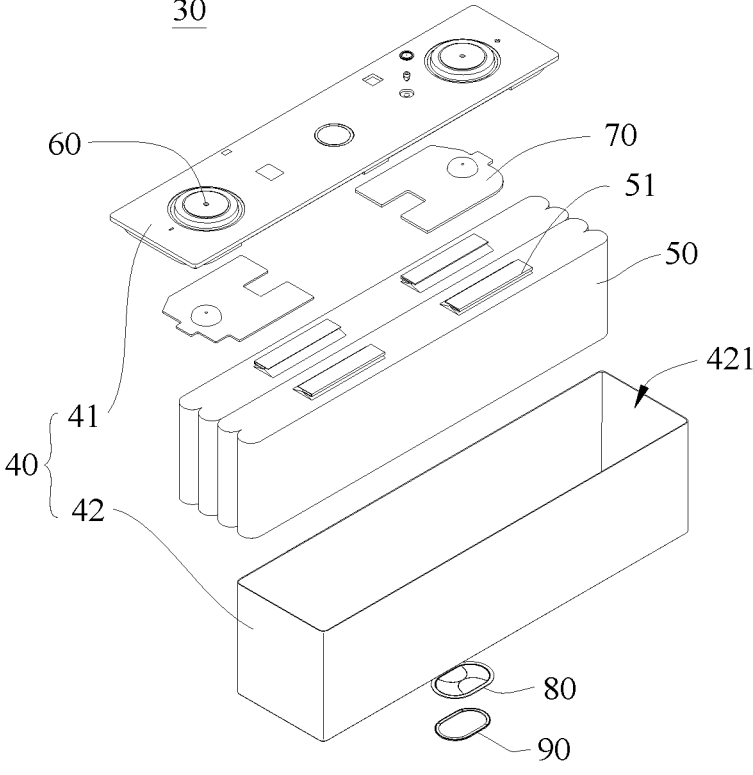
Figure 5:
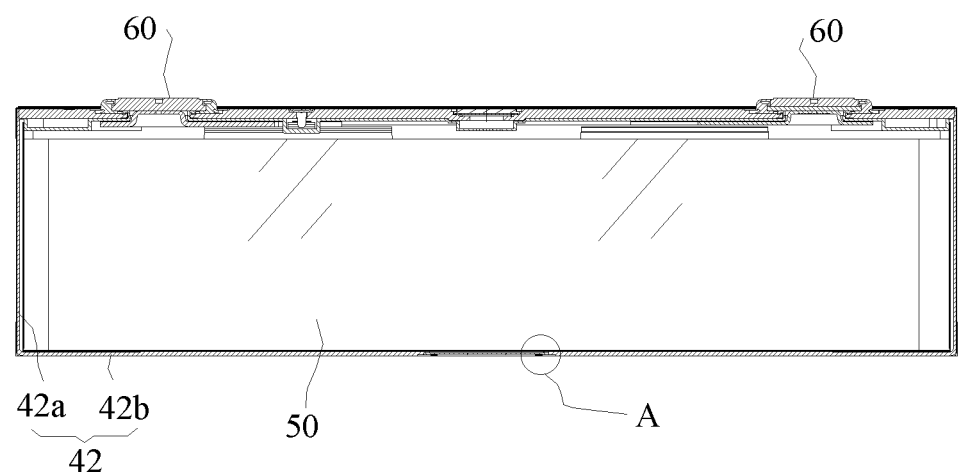
Figure 6:
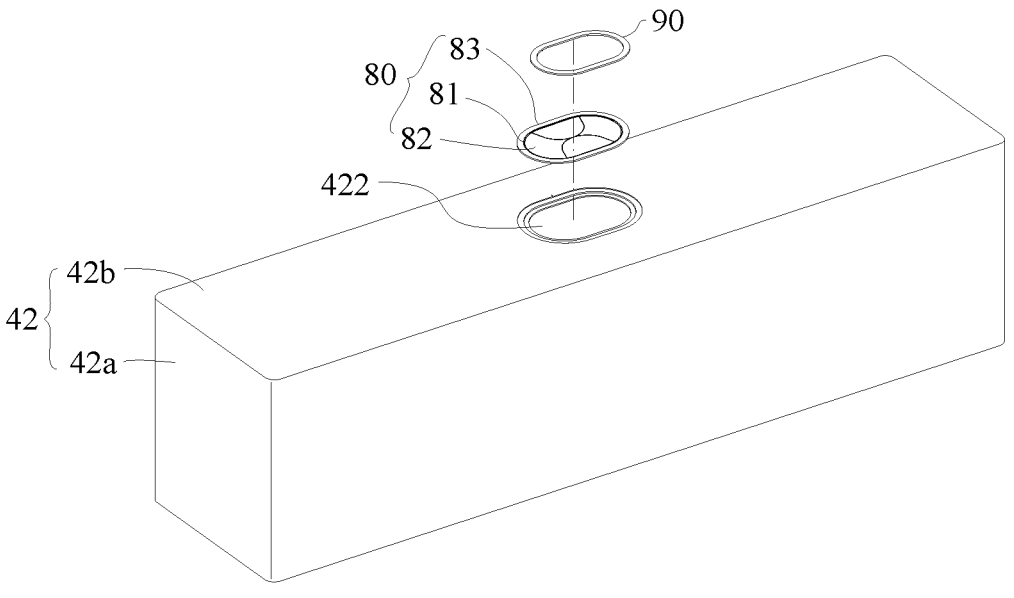
Figure 7:
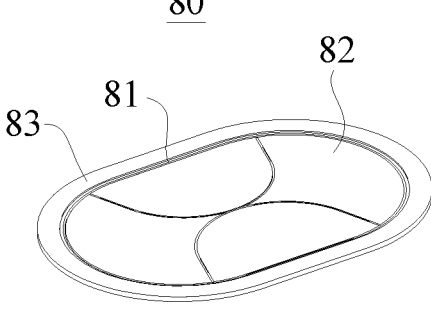
Figure 8:
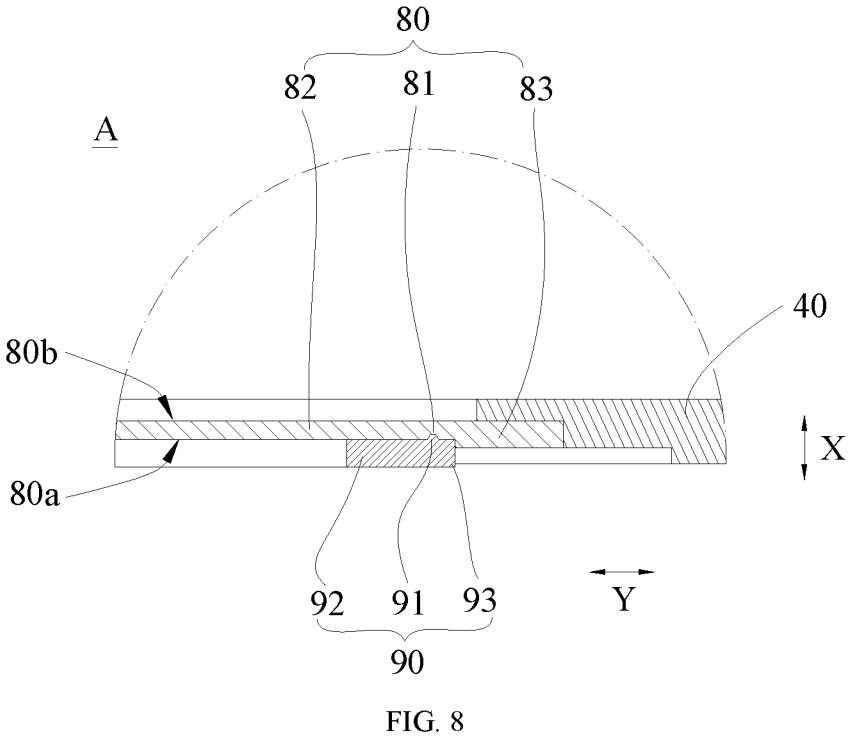
Figure 9:
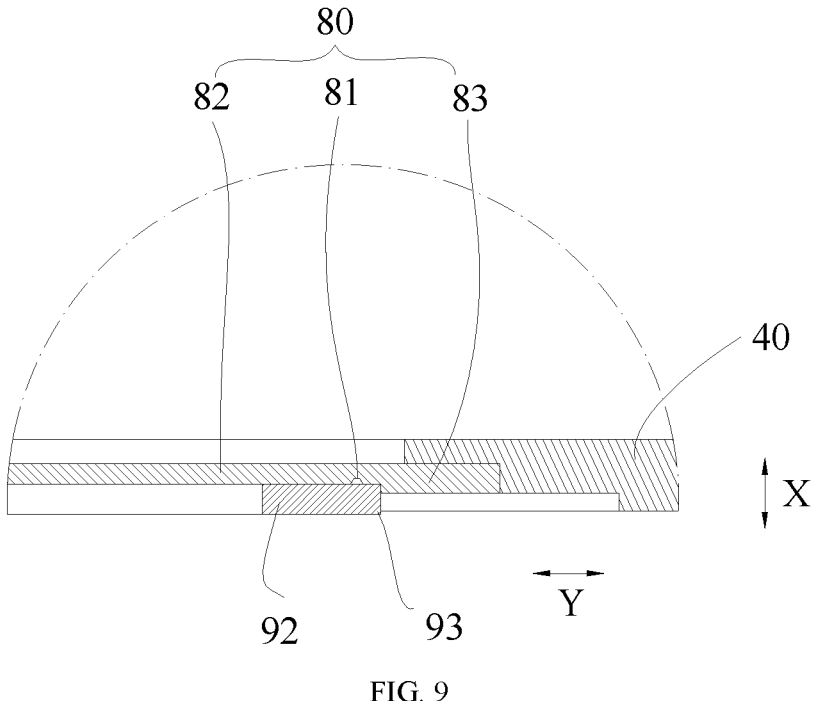
Figure 10:
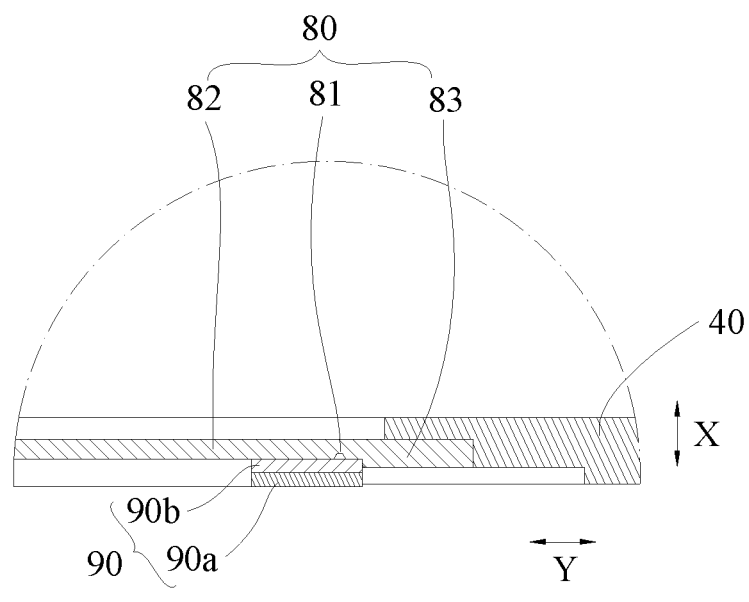
Figures 11, 12:
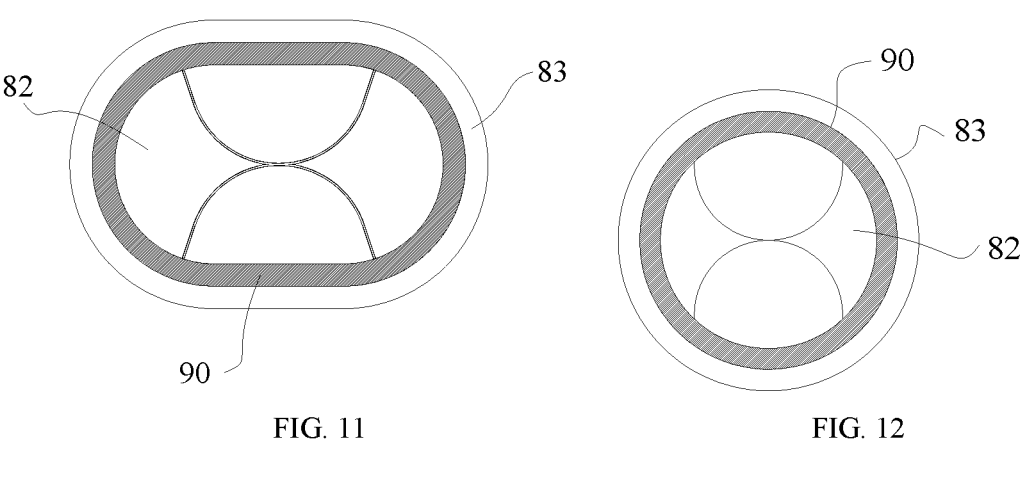
Figure 13:
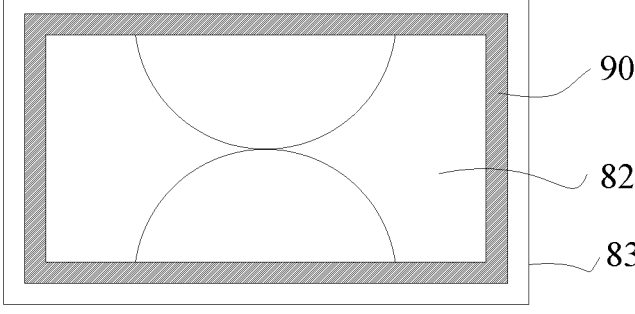

FIG. 1 is a partially structural diagram of a vehicle according to one embodiment of the present disclosure;

FIG. 2 is an exploded diagram of a battery according to one embodiment of the present disclosure;

FIG. 3 is a partially structural diagram of a battery module according to one embodiment of the present disclosure;

FIG. 4 is an exploded diagram of a battery cell according to one embodiment of the present disclosure;

FIG. 5 is a partially sectional diagram of the battery cell according to the embodiment shown in FIG. 4;

FIG. 6 is a partially exploded diagram of a battery cell according to one embodiment of the present disclosure;

FIG. 7 is a structural diagram of a pressure-relief mechanism according to one embodiment of the present disclosure;

FIG. 8 is a partially enlarged diagram of position A in FIG. 5;

FIG. 9 is a partially enlarged diagram of a battery cell according to another embodiment of the present disclosure;

FIG. 10 is a partially enlarged diagram of a battery cell according to another embodiment of the present disclosure;

FIG. 11 is a schematic diagram of coordination between a pressure-relief mechanism and a protective part according to another embodiment of the present disclosure;

FIG. 12 is a schematic diagram of coordination between a pressure-relief mechanism and a protective part according to another embodiment of the present disclosure;

FIG. 13 is a schematic diagram of coordination between a pressure-relief mechanism and a protective part according to another embodiment of the present disclosure;

FIG. 14 is a schematic diagram of coordination between a pressure-relief mechanism and a protective part according to another embodiment of the present disclosure;

FIG. 15 is a schematic diagram of coordination between a pressure-relief mechanism and a protective part according to another embodiment of the present disclosure;

FIG. 16 is a schematic diagram of coordination between a pressure-relief mechanism and a protective part according to another embodiment of the present disclosure;

FIG. 17 is a schematic diagram of coordination between a pressure-relief mechanism and a protective part according to another embodiment of the present disclosure;

FIG. 18 is a flowchart of a method for manufacturing battery cells according to one embodiment of the present disclosure;

FIG. 19 is a structural diagram of equipment for manufacturing battery cells according to one embodiment of the present disclosure.

In the accompanying drawings, the accompanying drawings are not drawn according to actual scale.

DETAILED DESCRIPTION OF EMBODIMENTS

The implementing methods of the present disclosure will be further described below with reference to accompanying drawings and embodiments. The following detailed description of the embodiments and the accompanying drawings are used to exemplarily describe the principle of the present disclosure, but cannot be used to limit the scope of the present disclosure, which means that the present disclosure is not limited to the described embodiments.

In the description of the present disclosure, it needs to be noted that, unless otherwise specified, "a plurality of" means two or more pieces; directional or positional relations indicated by terms "upper", "lower", "left", "right", "inner", "outer", etc. are used merely for facilitating and simplifying description of the present disclosure instead of indicating or implying that designated devices or components must be located at a specific position, constructed and operated at a specific position, and therefore cannot be construed as limiting the present disclosure. In addition, terms "first", "second", "third", etc. are used merely for an illustrative purpose and cannot be construed as indicating or implying relative significance. "Perpendicular" is not strictly perpendicular, but is within an allowance for errors. "Parallel" is not strictly parallel, but within an allowance for errors.

All nouns of locality in the following description indicate directions in the drawings, but do not limit the specific structure of the present disclosure. In the description of the present disclosure, it also needs to be noted that, unless otherwise clearly specified and defined, terms "installed", "connected", "connection" should be understood in a broad way, for example, the connection can be fixed connection, detachable connection or integral connection; or direct connection, or indirection connection via an intermediate. Those ordinarily skilled in the art can understand the specific meanings of the above-mentioned terms in the present disclosure upon specific situations.

In the present disclosure, battery cells can include lithium ion secondary batteries, lithium ion primary batteries, lithium-sulfur batteries, sodium-lithium ion batteries, sodium-ion batteries, or magnesium-ion batteries, which is not limited in the embodiment of the present disclosure. The battery cells can be cylindrical, flat, cuboid or other shapes, which is not limited in the embodiment of the present disclosure. The battery cells are usually classified by encapsulation means into three types: cylindrical battery cells, prismatic battery cells and flexibly packed battery cells, which is not also limited in the embodiment of the present disclosure.

The battery mentioned in the embodiment of the present disclosure refers a single physical module which includes one or a plurality of battery cells to supply higher voltage and capacitance. For example, the battery mentioned in the present disclosure can include a battery module, a battery pack, etc. The battery usually includes a case for encapsulating one or a plurality of battery cells. The case can avoid liquid or other foreign matters from influencing charging or discharging of the battery cell.

The battery cell includes an electrode assembly and an electrolytic liquid, and the electrode assembly includes a positive electrode plate, a negative electrode plate and a diaphragm. The battery cell functions mainly by motion of metallic ions between the positive electrode plate and the negative electrode plate. The positive electrode plate includes positive current collectors and positive active-material layers; the positive active-material layer is coated on a surface of the positive current collector; the positive current collector which is not coated with the positive active-material layer protrudes out of the positive current collector coated with the positive active-material layer; and positive current collectors which are not coated with the positive active-material layer are laminated to form a positive tab. Take the lithium-ion battery as an example. The positive current collector can be made of aluminum, and the positive active-material can be lithium cobalt oxide, lithium iron phosphate, ternary lithium or lithium manganate, etc. The negative electrode plate includes a negative current collector and a negative active-material layer; the negative active-material layer is coated on the surface of the negative current collector; the negative current collector which is not coated with the negative active-material layer protrudes out of the negative current collector coated with the negative active-material layer; and negative current collectors which are not coated with the negative active-material layer are laminated to form a negative tab. The material of the negative current collector can be copper, and a negative active-material can be carbon, silicone, etc. The diaphragm can be made of polypropylene (PP) or polyethylene (PE), etc. In addition, the electrode assembly can be a wound structure, or a laminated structure, which is not limited in the embodiment of the present disclosure.

Development of battery technologies requires consideration of design factors in many aspects at the same time, for example, performance parameters such as energy densities, cycle lives, discharging capacitance, charging and discharging factors. In addition, battery safety also needs to be considered.

The pressure-relief mechanism on the battery cell is important to battery safety. For example, occurrence of phenomena such as short-circuits and overcharging may cause thermal runaway within the battery cell to result in a dramatic rise in pressure or temperature. Under such a circumstance, actuation of a pressure-relief mechanism can release internal pressure and temperature to the outside to prevent the battery cell from exploding or firing.

The pressure-relief mechanism refers to a component or part which is actuated to release internal pressure or temperature when the internal pressure or temperature of the battery cell reaches a preset threshold value. The design of threshold values varies with design demand. The threshold value may depend on the material of one or several ones of the positive electrode plate, the negative electrode plate, the electrolytic liquid and the diaphragm in the battery cell. The pressure-relief mechanism can be in form of, for example, an explosion-proof valve, a gas valve, a pressure-relief valve or a safety valve, and can be specifically manufactured using a pressure-sensitive or temperature-sensitive component, which means that when the internal pressure or temperature of the battery cell reaches a preset threshold value, the pressure-relief mechanism acts or a weak structure provided in the pressure-relief mechanism is broken to form an opening or a channel for release of the internal pressure or temperature.

"Actuation" mentioned in the present disclosure refers to that the pressure-relief mechanism acts or is activated into a certain state such that the internal pressure and temperature of the battery cell can be released. The action of the pressure-relief mechanism can include but be not limited to: at least part of the pressure-relief mechanism is broken, smashed, torn or opened, etc. When the pressure-relief mechanism is actuated, high-temperature and high-pressure materials in the battery cell are discharged out via the actuated part. By such a method, the battery cell can release pressure and get cool at a pressure or temperature under control to avoid occurrence of potential severer accidents.

The materials discharged from the battery cell in the present disclosure include but are not limited to: the electrolytic liquid, dissolved or broken positive and negative electrode plates, chips of the diaphragm, high-temperature and high-pressure gases and flames generated by reactions, etc.

After finding that the battery cell presented pressure-relief blasting when predetermined conditions of thermal runaway were not satisfied during cycling of the battery cell, the inventor(s) made analyses and study on the structure and use environment of the battery cell. The inventor(s) found that advanced fatigue aging of the pressure-relief mechanism of the battery cell led to a decline in the threshold value of the pressure-relief mechanism, so that the pressure-relief mechanism blasted in advance when the internal pressure of the battery cell did not reach a preset pressure value. Further study showed that the internal pressure of the battery cell rose and dropped alternatively in the process of transport, temperature change, charging or discharging of the battery cell, so that the pressure-relief mechanism turned in a reciprocating way. Long-term reciprocating turnover of the pressure-relief mechanism caused fatigue aging in a local area to result in the opening of the pressure-relief mechanism and a decline in the threshold value.

Based on the above-mentioned problems, the inventor(s) improved the structure of the battery cell. The technical solution described in the embodiment of the present disclosure applies to battery cells, batteries including the battery cells, and electrical devices using the batteries.

Electrical devices can be vehicles, mobile phones, portable equipment, notebooks, steamships, space vehicles, electric toys, electric tools, etc. Vehicles can be oil-fueled vehicles, natural gas vehicles or new energy vehicles. New energy vehicles can be battery electric vehicles, hybrid electric vehicles, extended-range electric vehicles, etc. Space vehicles include airplanes, rockets, space ships, etc. Electric toys include fixed or mobile electric toys, for example, game machines, electric vehicle toys, electric ship toys, electric airplane toys, etc. Electric tools include metal cutting and shopping electric tools, grinding electric tools, assembling electric tools, railway electric tools, for example, electric drills, electric grinders, electric wrenches, electric screwdrivers, electric hammers, electric impact drills, concrete vibrators, electric planers, etc. The embodiments of the present disclosure apply no particular limitations to the above-mentioned electrical devices.

To facilitate description of the following embodiments, vehicles as electrical devices are taken as an example.

As shown in FIG. 1, a vehicle 1 is internally provided with a battery 10. The battery 10 can be arranged at a bottom portion, head portion or tail portion of the vehicle 1. The battery 10 can be used to supply power to the vehicle 1. For example, the battery 10 can serve as an operating power supply of the vehicle 1.

The vehicle 1 can further include a control unit 1*b* and a motor 1*a*. The control unit 1*b* is used to control the battery 10 to supply power to the motor 1*a*, for example, to meet the working power demand of the vehicle 1 for startup, navigation and running.

In some embodiments of the present disclosure, the battery 10 can serve as not only the operating power supply of the vehicle 1, but also a driving power supply of the vehicle 1 to replace or partially replace fuel or natural gases to provide the vehicle 1 with driving power.

As shown in FIG. 2 and FIG. 3, the battery 10 includes a battery cell 30 (not shown in FIG. 2). The battery 10 can further include a case for accommodating the battery cell 30.

The case is used to accommodate the battery cell 30. The case can be of a plurality of structures.

In some embodiments, the case can include a bottom housing 11 and a top housing 12. The bottom housing 11 and the top housing 12 are fastened to each other. The bottom housing 11 and the top housing 12 jointly define the accommodating space for accommodating the battery cell 30. The bottom housing 11 and the top housing 12 can both be of a hollow structure with an opening on one side. The opening side of the bottom housing 11 is fastened with the opening side of the top housing 12 to form the case with the accommodating space. A sealing member can further be arranged between the bottom housing 11 and the top housing

12 to realize a sealed connection between the bottom housing 11 and the top housing 12.

In actual use, the bottom housing 11 can be fastened to a top of the top housing 12. The bottom housing 11 can also be called upper casing, and the top housing 12 can also be called lower casing.

The bottom housing 11 and the top housing 12 can be in various shapes, for example, cylinder, cuboid, etc. In FIG. 2, exemplarily, the bottom housing 11 and the top housing 12 are both of cuboid structures.

In the battery 10, there can be one or a plurality of battery cells 30. When there are a plurality of battery cells 30, the plurality of battery cells 30 can be connected in series, in parallel or in a series-parallel way. Connection in a series-parallel way refers to that some battery cells 30 are connected in series and some in parallel. The plurality of battery cells 30 can be directly connected in series or in parallel or in a series-parallel way, and then a whole unit formed by the plurality of battery cells 30 is accommodated in the case, or, the plurality of battery cells 30 can be connected in series or in parallel or in a series-parallel way first to form battery modules 20. Then, a plurality of battery modules 20 are connected in series or in parallel or in a series-parallel way to form a whole unit, and accommodated in the case.

In some embodiments, as shown in FIG. 3, in the battery 10, there are a plurality of battery cells 30. The plurality of battery cells 30 are connected in series, in parallel or in a series-parallel way first to form the battery modules 20. Then, a plurality of battery modules 20 are connected in series or in parallel or in a series-parallel way to form a whole unit, and accommodated in the case.

In some embodiments, the plurality of battery cells 30 in the battery modules 20 can realize electrical connection through a converging part to realize series or parallel or series-parallel connection among the plurality of battery cells 30 in the battery modules 20.

As shown in FIG. 4, the battery cell 30 includes a casing 40, an electrode assembly 50, an electrode terminal 60, an insulating member and an adapter part 70. The casing 40 has a casing body 42 and an end cap 41, and the casing body 42 has an opening 421. The electrode assembly 50 is accommodated in the casing body 42, and the electrode assembly 50 includes a tab 51. The end cap 41 is used to cover the opening 421. The electrode terminal 60 is installed at the end cap 41. The insulating member is located on one side of the end cap 41 facing the electrode assembly 50. The adapter part 70 is used to connect the electrode terminal 60 and the tab 51 such that the tab 51 is electrically connected to the electrode terminal 60.

Where, the casing body 42 can be in various shapes, for example, cylinder, cuboid, etc. The shape of the casing body 42 can be determined according to the specific shape of the electrode assembly 50. For example, if the electrode assembly 50 is of a cylinder structure, the casing body 42 can be selected as a cylinder structure. If the electrode assembly 50 is of a cuboid structure, the casing body 42 can be selected as a cuboid structure. In FIG. 4, exemplarily, the casing body 42 and the electrode assembly 50 are both of cuboid structures.

The casing body 42 can be made of a plurality of materials, for example, copper, iron, aluminum, stainless steel, aluminum alloys, etc., which is not particularly limited in the embodiment of the present disclosure.

There can be one or a plurality of electrode assemblies 50 accommodated in the casing body 42. In FIG. 4, exemplarily, two electrode assemblies 50 are accommodated in the casing body 42.

In some embodiments, the electrode assembly 50 further includes a positive electrode plate, a negative electrode plate and a diaphragm. The electrode assembly 50 can be of a wound structure formed by winding the positive electrode plate, the diaphragm and the negative electrode plate. The electrode assembly 50 can be of a laminated structure formed by laminating the positive electrode plate, the diaphragm and the negative electrode plate.

The positive electrode plate can include a positive current collector and a positive active-material layer. The positive active-material layer is coated on a surface of the positive current collector. The negative electrode plate can include a negative current collector and a negative active-material layer. The negative active-material layer is coated on a surface of the negative current collector. The diaphragm between the positive electrode plate and the negative electrode plate is used to isolate the positive electrode plate from the negative electrode plate so as to reduce a risk of short-circuits between the positive electrode plate and the negative electrode plate.

Where, the material of the diaphragm can be PP (polypropylene) or PE (polyethylene), etc.

Tabs 51 in the electrode assembly 50 are divided into the positive tab and the negative tab. Positive tabs can be part of the positive current collector that is not coated with the positive active-material layer. Negative tabs can be part of the negative current collector that is not coated with the negative active-material layer.

In the embodiment of the present disclosure, referring to FIG. 4 and FIG. 5, the end cap 41 is used to cover the opening 421 of the casing body 42 to form closed space for accommodating the battery cell 30, and the closed space can further be used to accommodate electrolytes, for example electrolytic liquids. The electrode terminal 60 is an output part used to output electricity of the battery cell 30. There may be one or two electrode terminals 60.

The casing body 42 may have one or two openings 421. If the casing body 42 has one opening 421, there can be one end cap 41. If the casing body 42 have two openings 421, there can be two end caps 41. The two end caps 41 respectively cover two openings 421, and each of the end caps 41 can be provided with the electrode terminal 60.

In some embodiments, as shown in FIG. 4, the casing body 42 has one opening 421, and there is one end cap 41. The end cap 41 can be internally provided with two electrode terminals 60. One electrode terminal 60 is electrically connected to one tab (positive tab) of the electrode assembly 50 via one adapter part 70. The other electrode terminal 60 is electrically connected to the other tab (negative tab) of the electrode assembly 50 via the other adapter part 70.

In some embodiments, the casing body 42 has two openings 421. The two openings 421 are arranged on two opposite sides of the casing body 42, and there are two end caps 41. The two end caps 41 respectively cover the two openings 421 of the casing body 42. Under such a circumstance, there can be one electrode terminal 60 on each of the end caps 41. The electrode terminal 60 on one end cap is electrically connected to one tab (positive tab) of the electrode assembly 50 via one adapter part 70; and the electrode terminal 60 on the other end cap 41 is electrically connected to the other tab (negative tab) of the electrode assembly 50 via the other adapter part 70.

In some embodiments, the battery cell 30 can further include a pressure-relief mechanism 80. The pressure-relief mechanism 80 is installed on the casing 40. The pressure-relief mechanism 80 is used to release internal pressure of the battery cell 30 when the internal pressure or temperature of the battery cell 30 reaches a threshold value.

Exemplarily, the pressure-relief mechanism 80 can be an explosion-proof valve, an explosion-proof plate, a gas valve, a pressure-relief valve or a safety valve, etc.

Referring to FIG. 4 to FIG. 6, as an example implementing method, the casing 40 in the embodiment of the present disclosure has a wall portion; the wall portion has a through-hole 422; and the pressure-relief mechanism 80 covers the through-hole 422.

As an example implementing method, the casing body 42 of the battery cell 30 provided by the embodiment of the present disclosure includes a side wall 42a and a bottom wall 42b. The side wall 42a is used to connect the end cap 41. The bottom wall 42b and the opening 421 of the casing body 42 are arranged relative to each other along a thickness direction X. The thickness of the side wall 42a and the thickness of the bottom wall 42b are both smaller than the thickness of the end cap 41. In some optional embodiments, the side wall portion is the side wall 42a or the bottom wall 42b.

The end cap 41 and the casing body 42 are of split structures. The end cap and the casing body are in a sealed connection to form the casing 40. The pressure-relief mechanism 80 can be arranged on the side wall 42a and/or the bottom wall 42b.

The thickness of the casing body 42 is smaller than the thickness of the end cap 41 such that the rigidity of the end cap 41 is greater than the rigidity of the casing body 42. By the effect of the same pressure, the deformation degree of the end cap 41 is smaller than the deformation degree of the casing body 42. In the process of transport, temperature change or charging and discharging of the battery cell 30, the internal pressure of the battery cell 30 rises and drops alternatively, so the pressure-relief mechanism 80 is arranged on the side wall 42a and/or the bottom wall 42b of the casing body 42, such that under the condition that the end cap 41 faces a passenger compartment, high-temperature and high-pressure materials are prevented from being discharged toward the passenger compartment and do not bring a direct threat to passengers when the pressure-relief mechanism 80 is actuated.

Moreover, the thicknesses of the side wall 42a and the bottom wall 42b of the casing body 42 are smaller than the thickness of the end cap 41, so the side wall 42a or the bottom wall 42b of the casing body 42 deforms more greatly by the effect of the internal pressure than the end cap 41 does, thereby greatly influencing the pressure-relief mechanism 80.

In some embodiments, a through-hole 422 is provided at the bottom wall 42b of the casing body 42. The electrode assembly 50 is located between the bottom wall 42b of the casing body 42 and the end cap 41. When the battery cell 30 is applied to electrical devices such as vehicles, ships, vessels or space crafts, the end cap 41 of the battery cell 30 is arranged upward in a vertical direction, while the bottom wall 42b of the casing body 42 is arranged downward, such that the end cap 41 of the battery cell 30 is closer to drivers and passengers relative to the bottom wall 42b of the casing body 42. Therefore, when the pressure-relief mechanism 80 is arranged at the bottom wall 42b of the casing body 42, high-temperature and high-pressure substances discharged from the battery cell 30 do not bring a direct threat to personal safety under the condition that the pressure-relief mechanism 80 breaks to release pressure, enhancing use safety of the battery cell 30.

In various embodiment in accordance with the present disclosure, to prevent the pressure-relief mechanism 80 from blasting to release pressure in advance, referring to FIG. 4 to FIG. 7, the casing 40 in the embodiment of the present disclosure has the wall portion. The battery cell 30 of the embodiment of the present disclosure further includes the pressure-relief mechanism 80 and a protective part 90, and the pressure-relief mechanism 80 is arranged on the wall portion. The pressure-relief mechanism 80 includes a weak portion 81 and a first portion 82 and a second portion 83 which are arranged on two sides of the weak portion 81, and the weak portion 81 is used to connect the first portion 82 and the second portion 83. The pressure-relief mechanism 80 is configured in such a way that the weak portion 81 is broken to release pressure when the internal pressure of the casing 40 reaches a threshold value. The protective part 90 is arranged on the pressure-relief mechanism 80, and the protective part 90 is used to connect the first portion 82 and the second portion 83 to increase the strength of connection between the first portion 82 and the second portion 83.

In the process of transport, temperature change, charging and discharging of the battery cell 30, the internal pressure of the battery cell 30 rises and drops alternatively, such that the pressure-relief mechanism 80 generates deformation of bulging in a direction away from the electrode assembly 50 or recessing in a direction close to the electrode assembly 50. When the pressure-relief mechanism 80 bulges or recesses alternatively, the weak portion 81 connected to the first portion 82 and the second portion 83 bears alternating stresses to present alternating fatigue aging or breakage, such that the strength of the weak portion 81 declines and then the weak portion 81 tends to break to release the internal pressure of the battery cell 30 when the internal pressure of the battery cell 30 does not reach a preset pressure value, resulting in that the pressure-relief mechanism 80 blasts to release pressure in advance.

For the battery cell 30 provided by various embodiment, the weak portion 81 is arranged on the pressure-relief mechanism 80, such that pressure can be released when the internal pressure of the casing 40 reaches the threshold value, ensuring safety when the battery cell 30 is in thermal runaway. The protective part 90 is arranged to increase the strength of connection between the first portion 82 and the second portion 83, such that under the condition that the internal pressure of the battery cell 30 rises and drops alternatively, the protective part 90 can share an acting force applied to the weak portion 81 when the pressure-relief mechanism 80 bulges or recesses, thus facilitating reduction of the alternating stresses borne by the weak portion 81. Under the condition of the battery cell 30 in normal use, the probability that the pressure-relief mechanism 80 blasts to release pressure in advance because of alternating fatigue aging or breakage of the weak portion 81 is reduced, facilitating improvement on the use safety and stability of the battery cell 30.

It should be noted that, the casing 40 includes the casing body 42 and the end cap 41; either the casing body 42 includes the wall portion, or the end cap 41 includes the wall portion, which means that the pressure-relief mechanism 80 can be arranged on the casing body 42, and of course can also be arranged on the end cap 41.

The pressure-relief mechanism 80 in various embodiment is arranged on the wall portion. It can be understood that, the casing 40 and the pressure-relief mechanism 80 can be of split structures, which means that the two are respectively and independently processed and manufactured and then assembled in a mechanical connection way. The casing 40 and the pressure-relief mechanism 80 can also be of an integrally molded structure. A predetermined area of the wall portion of the casing 40 is thinned to form the pressure-relief mechanism 80.

The weak portion 81 of the battery cell 30 in various embodiments refers to a portion on the pressure-relief mechanism 80 that is inferior to the first portion 82 and the second portion 83 in strength and is easily broken, smashed, torn or opened. The pressure-relief mechanism 80 includes the weak portion 81 and the first portion 82 and the second portion 83 which are arranged on two sides of the weak portion 81. It can be understood that, the predetermined area of the pressure-relief mechanism 80 is thinned, the thinned portion forms the weak portion 81, and two parts which are divided by the weak portion 81 and connected through the weak portion 81 form the first portion 82 and the second portion 83. Or, the predetermined area of the pressure-relief mechanism 80 undergoes material treatment such that the strength of such area is less than the strength of other areas; the area with lower strength forms the weak portion 81, and two parts which have higher strength and are divided by the weak portion 81 and connected through the weak portion 81 form the first portion 82 and the second portion 83.

The weak portion 81 of the battery cell 30 in this embodiment can be of an annular structure, or a strip structure, etc. When the weak portion 81 is of an annular structure, the first portion 82 is located in an area surrounded by the weak portion 81, the second portion 83 is located between the weak portion 81 and the wall portion, and the second portion 83 is used to connect the wall portion of the casing 40. When the weak portion 81 is of a strip structure, the first portion 82 and the second portion 83 are both used to connect the wall portion of the casing 40.

For the battery cell 30 in the embodiment of the present disclosure, the pressure-relief mechanism 80 has an outer surface 80a and an inner surface 80b which are opposite to each other along its own thickness direction X. The outer surface 80a of the pressure-relief mechanism 80 faces the outside environment, while the inner surface 80b faces the internal space of the casing 40, or the inner surface 80b faces the electrode assembly 50. At least one of the outer surface 80a and the inner surface 80b can be provided with the protective part 90.

For the battery cell 30 in the embodiment of the present disclosure, the protective part 90 is arranged to cover at least part of the weak portion 81 or to completely cover the weak portion 81. The protective part 90 can be of an integrated structure, and of course can also include a plurality of protective units, where the plurality of protective units can be arranged successively or at an interval along an extending trajectory of the protective part 90.

The protective part 90 can be connected to the first portion 82 and the second portion 83 and be not connected to the weak portion 81. Alternatively, the protective part 90 can also be connected to the first portion 82, the second portion 83 and the weak portion 81 at the same time.

The protective part 90 can be of a membrane layer structure with a certain thickness, a membrane layer, or a combination of two or more membrane layer structures.

The protective part 90 is used to increase the strength of connection between the first portion 82 and the second portion 83 to reduce influences on the weak portion 81 by deformation of the pressure-relief mechanism when the battery cell 30 is not in thermal runaway. It can be understood that, with respect to the pressure-relief mechanism 80 without the protective part 90, for the battery cell 30 provided by the embodiment of the present disclosure, the protective part 90 can bear the acting force applied to the weak portion 81 when the pressure-relief mechanism 80 bulges or recesses under the condition that the pressure-relief mechanism 80 bears a consistent acting force along the thickness direction, effectively reducing the probability of breakage of the weak portion 81 when the battery cell 30 is not in thermal runaway.

As an example implementing method, for the battery cell 30 provided by the embodiment of the present disclosure, the pressure-relief mechanism 80 covers the through-hole 422, and the second portion 83 can be connected to the inner wall surface of the wall portion.

As an example implementing method, for the battery cell 30 provided by the embodiment of the present disclosure, the protective part 90 is further configured to change in physical properties when the internal pressure of the casing 40 reaches the threshold value so as to reduce or remove the force of connection of the protective part 90 to the first portion 82 or to the second portion 83.

For the battery cell 30 provided by the embodiment of the present disclosure, the protective part 90 is further configured to change in physical properties when the internal pressure of the casing 40 reaches the threshold value to reduce or remove the connection force between the first portion 82 and the second portion 83, such that the weak portion 81 of the pressure-relief mechanism 80 can be broken in time to release pressure when the battery cell 30 is in thermal runaway.

For the battery cell 30 provided by the embodiment of the present disclosure, the protective part 90 can still be connected to the first portion 82 and the second portion 83 during changing in physical properties when the internal pressure of the casing 40 reaches the threshold value, despite that the connection force is smaller than the connection force when the pressure does not reach the threshold value. Alternatively, in the case of changing in physical properties when the internal pressure of the casing 40 reaches the threshold value, the protective part 90 can also be separated from the first portion 82 and the second portion 83 to remove the force of connection of the protective part 90 to the first portion 82 and to the second portion 83.

In this embodiment, changes in physical properties include changes of the protective part 90 in form, viscosity, etc. Exemplarily, changes in form refer to that, for example, when the internal pressure of the casing 40 reaches the threshold value, the protective part 90 can be switched from a cured state into a softened state, or switched from the cured state into a melted state. Changes in viscosity refer to that, for example, when the internal pressure of the casing 40 reaches the threshold value, the protective part 90 can be switched from a viscose state into a non-viscose state, as long as the force of connection of the protective part 90 to the first portion 82 and to the second portion 83 can be reduced or removed, such that the weak portion 81 of the pressure-relief mechanism 80 can be broken in time to release the pressure of the battery cell 30 when the battery cell 30 is in thermal runaway.

For the battery cell 30 provided by the embodiment of the present disclosure, the protective part 90 is further configured in such a way that, in the process of generating changes in physical properties when the internal pressure of the casing 40 reaches the threshold value, the protective part 90 can completely change in physical properties, for example, the protective part can be completely softened or melted. Alternatively, in some examples, the protective part 90 can also partially change in physical conditions, for example, in the case of a physical change from the viscose state into the non-viscose state, the physical change can occur only at joints with the first portion 82 and the second portion 83, also ensuring safety performance when the battery cell 30 is in thermal runaway.

As an example implementing method, for the battery cell 30 provided by the embodiment of the present disclosure, the weak portion 81 is formed by forming a groove on the outer surface 80a of the pressure-relief mechanism 80, and the thickness of the weak portion 81 is smaller than the thickness of the first portion 82 and the thickness of the second portion 83.

For the battery cell 30 provided by the embodiment of the present disclosure, the way that the groove is formed on the outer surface 80a of the pressure-relief mechanism 80 to form the weak portion 80 helps formation of the weak portion 81 and makes the strength of the weak portion 81 lower than the strength of the first portion 82 and the strength of the second portion 83, effectively ensuring that the weak portion 81 can be broken in time when the battery cell 30 is in thermal runaway.

Exemplarily, machining can be adopted to remove materials of the pressure-relief mechanism 80 to form the groove, facilitating reduction in the processing cost and processing difficulties.

As shown in FIG. 8, in some embodiments, when the weak portion 81 is formed by forming the groove on the outer surface 80a of the pressure-relief mechanism 80, the protective part 90 can be at least partly accommodated in the groove; the protective part 90 is used to connect the groove wall of the groove; and the protective part 90 is configured to switch from the cured state into the softened state or from the cured state into the melted state when the internal pressure of the casing 40 reaches the threshold value.

Since the groove wall of the groove includes the opposite surfaces of the first portion 82 and the second portion 83, the requirement of connection of the protective part 90 to the first portion 82 and to the second portion 83 can be satisfied when the protective part 90 is at least partly accommodated in the groove and is used to connect the wall groove of the groove, thereby increasing the strength of connection between the first portion and the second portion.

The protective part 90 is configured to, when the internal pressure of the casing 40 reaches the threshold value, switch from the cured state into the softened state, or switch from the cured state into the melted state. The above-mentioned arrangement facilitates formation of the protective part 90 in the groove, and when the internal pressure of the casing 40 reaches the threshold value, facilitates changes of the protective part 90 in the physical properties, reducing or removing the force of connection to the first portion 82 and the second portion 83.

As an example implementing method, the protective part 90 can include at least one of a polypropylene membrane layer, a polyethylene membrane layer and a paraffin membrane layer.

Exemplarily, the protective part 90 can include the polypropylene membrane layer, and the protective part 90 can be at least partly accommodated in the groove by spraying polypropylene powder into the groove and allowing the polypropylene powder to cure.

Alternatively, the protective part 90 can also include the polyethylene membrane layer, and similarly, the protective part 90 can be at least partly accommodated in the groove by spraying polyethylene powder into the groove and allowing the polyethylene powder to cure.

In some embodiments, the protective part 90 can further include the paraffin membrane layer; the weak portion 81 can be soaked in a paraffin solution; the paraffin solution on the soaked area of the weak portion 81 is cured to form the protective part 90, and the protective part is at least partly accommodated in the groove.

In some embodiments, the protective part 90 can include only one of the polypropylene membrane layer, the polyethylene membrane layer and the paraffin membrane layer, and of course, in some embodiments, can include a combination of any two of the polypropylene membrane layer, the polyethylene membrane layer and the paraffin membrane layer.

Take inclusion of any two of the polypropylene membrane layer, the polyethylene membrane layer and the paraffin membrane layer as an example. In some embodiments, the weak portion 81 can be internally molded with one polypropylene membrane layer first, and then one polyethylene membrane layer is molded on the polypropylene membrane layer. Or, one polyethylene membrane layer is molded on the weak portion 81 first, and then one polypropylene membrane layer is molded on the polyethylene membrane layer. Or, the weak portion 81 is internally molded with one polypropylene membrane layer first, and then one paraffin membrane layer is molded on the polypropylene membrane layer. The protective part 90 can include a combination of any two of the polypropylene membrane layer, the polyethylene membrane layer and the paraffin membrane layer, and the sequence of the any two layer structures is not limited during molding, as long as the demand for connection to the first portion 82 and to the second portion 83 is satisfied to increase the strength of connection between the first portion and the second portion, and it can be ensured that the physical properties change to reduce or remove the force of connection to the first portion 82 and/or to the second portion 83 when the battery cell 30 is in thermal runaway.

In some embodiments, the protective part 90 can include the polypropylene membrane layer, the polyethylene membrane layer and the paraffin membrane layer at the same time, and the sequence of the polypropylene membrane layer, the polyethylene membrane layer and the paraffin membrane layer is not limited during molding.

For the protective part 90 provided by the embodiment of the present disclosure, the protective part 90 can be completely located in the groove where the weak portion 81 is formed, and of course, can be partly located in the groove where the weak portion 81 is formed and partly protrude out of the groove, and the part protruding out of the groove can be connected to the first portion 82 or the second portion 83 on one side of the groove in a width direction Y. Alternatively, the part protruding out of the groove can also be respectively connected to the first portion 82 and the third portion 83 on two sides of the groove in the width direction Y.

As an example implementing method, the protective part 90 covers the groove along the width direction Y of the groove, and the protective part 90 is respectively connected to the first portion 82 and to the second portion 83 along the width direction Y of the groove. The above-mentioned arrangement can also facilitate connection of the protective part 90 to the first portion 82 and to the second portion 83, and ensure an increase in the strength of connection between the first portion 82 and the second portion 83, ensuring the safety of the pressure-relief mechanism when the battery cell 30 is not in thermal runaway.

In some embodiments, when the protective part 90 covers the groove along the width direction Y of the groove, the protective part 90 can also be at least partly accommodated in the groove. In some optional embodiments, for the battery cell 30 provided by the embodiments of the present disclosure, the protective part 90 can include a main body portion 91 and a first connecting portion 92 and a second connecting portion 93 which are located on two sides of the main body portion 91 along the width direction Y of the groove; the main body portion 91 is accommodated in the groove and is used to connect the groove wall of the groove; the first connecting portion 92 is used to connect the first portion 82, and the second connecting portion is used to connect the second portion 83.

For the battery cell 30 provided by the embodiments of the present disclosure, through the connection of the main body portion 91 to the first portion 82 and to the second portion 83, and through the connection between the first connecting portion 92 and the first portion 82 and the connection between the second connecting portion 93 and the second portion 83, the reliability of connection between the first portion 82 and the second portion 83 can be enhanced, and the strength of connection between the first portion 82 and the second portion 83 is ensured when the battery cell 30 is not in thermal runaway.

As shown in FIG. 9, in some embodiments, when the protective part 90 covers the groove along the width direction Y of the groove, the protective part 90 can cover the groove only and together with the groove surrounds a cavity. On the basis that the requirement for strength of connection to the first portion 82 and to the second portion 83 is satisfied, means such as pasting can be adopted to implement direction connection to the first portion 82 and the second portion 83. For example, a means of directly pasting the polyethylene membrane layer or the polypropylene membrane layer can be used to connect the protective part 90 to the first portion 82 and to the second portion 83.

As an example implementing method, for the battery cell 30 provided by the embodiment of the present disclosure, the melting point of the protective part 90 is lower than the melting point of the pressure-relief mechanism 80.

Since the melting point of the protective part 90 is lower than the melting point of the pressure-relief mechanism 80, the protective part 90 changes in physical properties, for example, gets melted or softened, prior to the pressure-relief mechanism 80 when the battery cell 30 is in thermal runaway, reducing or removing the force of connection of the protective part 90 to the first portion 82 or to the second portion 83, and facilitating breakage of the weak portion 81 to release pressure.

In some embodiments, the pressure-relief mechanism 80 can be made from the same metallic material as that of the casing body 42 or the end cap 41 of the casing 40, and of course can be made from a metallic material different from that of the casing body 42 or the end cap 41, as long as the demand for connection to the wall portion of the casing 40 can be satisfied and actuation can be implemented to release internal pressure or temperature when the battery cell 30 is in thermal runaway.

In some embodiments, the material of the protective part 90 can be at least one of the above-mentioned polypropylene membrane layer, polyethylene membrane layer and paraffin membrane layer, and of course can also be other materials, as long as the strength of connection between the first portion 82 and the second portion 83 can be increased and meanwhile it is ensured that the melting point is lower than the melting point of the pressure-relief mechanism 80, such that when the battery cell 30 is in thermal runaway, the force of connection of the protective part 90 to the first portion 82 or to the second portion 83 is reduced or removed.

It can be understood that, the battery cells 30 provided by the foregoing embodiments of the present disclosure, are all described by taking the protective part 90 which includes at least one of the polypropylene membrane layer, the polyethylene membrane layer and the paraffin membrane layer as an example. This is an example implementing method.

As shown in FIG. 10, in some other embodiments, the protective part 90 includes a basal layer 90a and a binding layer 90b which are provided in a laminated way; the binding layer 90b is used to connect the basal layer 90a and the pressure-relief mechanism 80; and the binding layer 90b is configured to switch from the viscous state into the non-viscous state when the internal pressure of the casing 40 reaches a threshold value.

When the protective part 90 includes the basal layer 90a and the binding layer 90b which are arranged in a laminated way, the binding layer 90b of the protective part 90 can be at least partly accommodated in the groove, and of course can cover the groove and together with the groove forms a cavity, as long as the requirement of connection between the first portion 82 and the second portion 83 can be satisfied.

As shown in FIG. 11 to FIG. 13, as an example implementing method, for the battery cell 30 provided by the embodiment of the present disclosure, the protective part 90 completely covers the weak portion 81 along the extending trajectory of the weak portion 81. Through the above-mentioned arrangement, an increase in the strength of connection between the first portion 82 and the second portion 83 can be ensured.

For the battery cell 30 provided by the embodiment of the present disclosure, the extending trajectory of the weak portion 81 is related to the shape of the weak portion 81; when the weak portion 81 is of an annular structure, the extending trajectory of the weak portion is an annular trajectory; and when the weak portion 81 is of a strip structure, the extending trajectory of the weak portion is a straight-line trajectory with a starting point and an ending point.

As an example implementing method, for the battery cell 30 provided by the embodiment of the present disclosure, the weak portion 81 can be of an annular structure; the first portion 82 is located in an area surrounded by the weak portion 81 and is used to turn after the weak portion 81 is broken, and the second portion 83 is located between the weak portion 81 and the wall portion, and is used to connect the wall portion. When the protective part 90 completely covers the weak portion 81 along the extending trajectory of the weak portion 81, the entire protective part 90 can be of an annular structure which covers the weak portion 81.

In some embodiments, the weak portion 81 can be in an annular shape like a waist circle or a track as shown in FIG. 11, a round ring as shown in FIG. 12, or an polygonally annular shape like a rectangle as shown in FIG. 13, and of course can be in other shapes such as an elliptical ring, as long as a closed loop can be formed to connect the first portion 82 and the second portion 83.

In some embodiments, when the weak portion 81 is of an annular structure, the first portion 82 can be shaped like a waist circle, a roundness, a polygon such as a rectangle or an oval, matched with the shape of the weak portion 81, and correspondingly, the second portion 83 can be shaped like a waist circle, a round ring, a polygonal ring such as a rectangle, an oval ring, etc., matched with the shape of the weak portion 81.

It can be understood that, for the battery cell 30 provided by the embodiment of the present disclosure, the protective part 90 is not limited to completely covering the weak portion 81 along the extending trajectory of the weak portion 81.

As shown in FIG. 14 and FIG. 15, in some optional embodiments, the protective part 90 has two or more protective units 90c, and the two or more protective units 90c are distributed at an interval on an extending trajectory of the weak portion 81. Through the above-mentioned arrangement, demand for an increase in the strength of connection between the first portion 82 and the second portion 83 can also be satisfied. Moreover, the protective units 90c are distributed at an interval on the extending trajectory of the weak portion 81, such that the protective part 90 can properly increase the strength of connection between the first portion 82 and the second portion 83, facilitating the actuation of the pressure-relief mechanism 80 when the battery cell 30 is in thermal runaway.

In some embodiments, the protective units 90c of the battery cell 30 provided by the embodiment of the present disclosure can be two or more membrane layer structures, which are distributed at an interval and independent of each other along the extending trajectory of the weak portion 81. The protective units 90c can be of polygonal structures such as round, oval and square structures, and of course can be in irregular shapes, as long as the connection of each of the protective units 90c to the first portion 82 and to the second portion 83 can be ensured to increase the strength of connection between the first portion 82 and the second portion 83.

The number of the protective units 90c can be set according to the shape of the weak portion 81 and the sizes on the extending trajectory, and can be two, three or more. Exemplarily, the number of the protective units 90c can be four, and the four protective units 90c can be distributed at an interval on the extending trajectory of the weak portion 81.

As shown in FIG. 14, exemplarily, the protective units 90c can be of square structures; two or more protective units 90c are distributed uniformly at an interval along the extending trajectory of the weak portion 81, and the protective units 90c are arranged to be independent of each other.

As shown in FIG. 15, of course, as an example implementing method, in some embodiments, two or more protective units 90c can also be distributed at an interval along the extending trajectory of the weak portion 81, and meanwhile, one end of each of the protective units 90c extends toward and gathers in the center of the pressure-relief mechanism 8. When the number of the protective units 90c is four, the protective part 90 can be entirely shaped as a cross.

It can be understood that, the above-mentioned embodiments of the present disclosure are all described by taking the weak portion 81 of an annular structure as an example. This is an example implementing method. However, the embodiments of the present disclosure are not limited to the above-mentioned implementing method.

As shown in FIG. 16 and FIG. 17, in some embodiments, the weak portion 81 can be of a strip structure, and the first portion 82 and the second portion 83 are both used to connect the wall portion. When the weak portion 81 is of a strip structure, the extending trajectory of the weak portion can be a straight line.

When the weak portion 81 is of a strip structure, the first portion 82 and the second portion 83 can be arranged opposite to each other in a direction perpendicular to the length direction of the weak portion 81 and are connected through the weak portion 81.

As shown in FIG. 16, when the weak portion 81 is of a strip structure, the protective part 90 can also extend along the extending trajectory of the weak portion 81 and completely cover the weak portion 81. Exemplarily, the protective part 90 can be of a strip structure in a shape matched with the shape of the weak portion 81 and covers the weak portion 81.

As shown in FIG. 17, of course, when the protective part 90 adopts a strip structure, the protective part 90 can also include two or more protective units 90c, and the two or more protective units 90c are distributed at an interval along the extending trajectory of the weak portion 81, as long as the strength of connection between the first portion 82 and the second portion 83 can be increased.

As shown in FIG. 18, according to an embodiment of the present disclosure, a method for manufacturing battery cells 30 is provided, including:

S100, providing an end cap 41 and a casing body 42, where the casing body 42 has an opening 421, the end cap 41 is configured to be capable of sealing the opening 421, either the casing body 42 or the end cap 41 is provided with a pressure-relief mechanism 80, the pressure-relief mechanism 80 includes a weak portion 81 and a first portion 82 and a second portion 83 which are arranged on two sides of the weak portion 81, the weak portion 81 is used to connect the first portion 82 and the second portion 83, and the pressure-relief mechanism 80 is configured in such a way that the weak portion 81 is broken to release pressure when the pressure in a unit formed by the casing body 42 and the end cap 41 reaches a threshold value;

S200, providing a protective part 90, where the protective part 90 is arranged on the pressure-relief mechanism 80, and the protective part 90 is used to connect the first portion 82 and the second portion 83 to increase the strength of connection between the first portion 82 and the second portion 83;

S300, providing an electrode assembly 50, where the electrode assembly 50 is installed in the casing body 42; and S400, assembling the end cap 41 and the casing body 42, where the end cap 41 is connected to the casing body 42 and covers the opening 421.

For the battery cell 30 manufactured using the method for manufacturing battery cells 30 according to the embodiment of the present disclosure, the weak portion 81 is arranged on the pressure-relief mechanism 80, such that pressure can be released when the pressure in the casing 40 reaches the threshold value, ensuring safety when the battery cell 30 is in thermal runaway. The protective part 90 is arranged to increase the strength of connection between the first portion 82 and the second portion 83, such that under the condition that the internal pressure of the battery cell 30 rises and drops alternatively, the protective part 90 can share an acting force applied to the weak portion 81 when the pressure-relief mechanism 80 bulges or recesses, facilitating reduction of the alternating stress borne by the weak portion 81. Under the condition of the battery cell 30 in normal use, the probability that the pressure-relief mechanism 80 blasts to release pressure in advance because of alternating fatigue aging or breakage of the weak portion 81 is reduced, facilitating improvement on the use safety and stability of the battery cell 30.

The method for manufacturing battery cells 30 according to the embodiment of the present disclosure can be used to manufacture the battery cell 30 in the above-mentioned embodiments.

As an example implementing method, step S200 includes: pasting the protective part 90 in an area, with the weak portion 81, of the end cap 41 or the casing body 42, where the protective part 90 includes at least one of a polypropylene membrane layer and a polyethylene membrane layer. Exemplarily, the protective part 90 can include only the polypropylene membrane layer, or the protective part 90 can include only the polyethylene membrane layer. Alternatively, in some examples, the protective part 90 can include the polypropylene membrane layer and the polyethylene membrane layer at the same time; either the polypropylene membrane layer or the polyethylene membrane layer can be pasted in the area, with the weak portion 81, of the end cap 41 or the casing body 42 first, and then the other is pasted. For example, the area with the weak portion 81 can be pasted with the polypropylene membrane layer first, and then pasted with the polyethylene membrane layer.

In some optional examples, step S200 can further include: spraying protective powder onto the area, the weak portion 81, of the end cap 41 or the casing body 42 and allowing the protective powder to cure to form the protective part 90, where the protective powder includes at least one of polypropylene powder and polyethylene powder. Exemplarily, the protective powder can include only the polypropylene powder, or the protective powder can include only the polyethylene powder. Alternatively, in some examples, the protective powder can include the polypropylene powder and the polyethylene powder.

In some optional examples, step S200 can further include: soaking the area, with the weak portion 81, of the end cap 41 or the casing body 42 in a paraffin solution and allowing the paraffin solution on the area with the weak portion 81 to cure to form the protective part 90.

As shown in FIG. 19, the embodiment of the present disclosure provides equipment 100 for manufacturing battery cells 30, including:

a first provision module 1001 for providing an end cap 41 and a casing body 42, where the casing body 42 has an opening 421; the end cap 41 is configured to be capable of sealing the opening 421, either the casing body 42 or the end cap 41 is provided with a pressure-relief mechanism 80, the pressure-relief mechanism 80 includes a weak portion 81 and a first portion 82 and a second portion 83 which are arranged on two sides of the weak portion 81, the weak portion 81 is used to connect the first portion 82 and the second portion 83, the pressure-relief mechanism 80 is configured in such a way that the weak portion 81 is broken to release pressure when the pressure in a unit formed by the casing body 42 and the end cap 41 reaches a threshold value;

a second provision module 1002 for providing a protective part 90, where the protective part 90 is arranged on the pressure-relief mechanism 80, and the protective part 90 is used to connect the first portion 82 and the second portion 83 to increase the strength of connection between the first portion 82 and the second portion 83;

a third provision module 1003 for providing an electrode assembly 50, where the electrode assembly 50 is installed in the casing body 42; and an assembling module 1004 for assembling the end cap 41 and the casing body 42, where the end cap 41 is connected to the casing body 42 and covers the opening 421.

For the equipment 1000 for manufacturing battery cells 30 provided by the embodiment of the present disclosure, the weak portion 81 is arranged on the pressure-relief mechanism 80, such that pressure can be released when the internal pressure of the casing 40 reaches the threshold value, thereby ensuring safety when the battery cell 30 is in thermal runaway. The protective part 90 is arranged to increase the strength of connection between the first portion 82 and the second portion 83, such that under the condition that the internal pressure of the battery cell 30 rises and drops alternatively, the protective part 90 can share the acting force applied to the weak portion 81 when the pressure-relief mechanism 80 bulges or recesses to help reduce the alternating stress borne by the weak portion 81 and minimize the possibility of advanced pressure-relief blasting of the pressure-relief mechanism 80 caused by alternating fatigue aging or breakage of the weak portion 81 under the normal use of the battery cell 30, thereby facilitating improvement on the use safety and stability of the battery cell 30.

The present disclosure is described with reference to optional embodiments, and can be modified in various ways within the scope of the present disclosure, and parts mentioned herein can be replaced by equivalents. In particular, under the condition of no structural conflicts, all technical characteristics mentioned in all embodiments can be combined in any way. The present disclosure is not limited to the specific embodiments disclosed herein, but includes all technical solutions falling within the scope defined by the claims.

What is claimed is:

1. A battery cell, comprising:

a casing having a wall portion;

a pressure-relief mechanism arranged on the wall portion, the pressure-relief mechanism comprising a weak portion and a first portion and a second portion arranged on two sides of the weak portion, the weak portion being configured to connect the first portion and the second portion, and the pressure-relief mechanism being configured in such a way that the weak portion is broken to release pressure when internal pressure of the casing reaches a threshold value; and, a protective part disposed on the pressure-relief mechanism, the protective part being configured to connect the first portion and the second portion to increase strength of connection between the first portion and the second portion, wherein the weak portion is formed by forming a groove on an outer surface of the pressure-relief mechanism, at least a part of the protective part is accommodated in the groove, the protective part is configured to connect groove walls of the groove.

2. The battery cell according to claim 1, wherein the protective part is further configured to change in physical properties when the internal pressure of the casing reaches the threshold value to reduce or remove connection of the protective part to the first portion or to the second portion.

3. The battery cell according to claim 1, wherein a thickness of the first portion and a thickness of the second portion are respectively greater than a thickness of the weak portion.

4. The battery cell according to claim 1, wherein the protective part is further configured to switch from a cured state into a softened state or to switch from the cured state into a melting state when the internal pressure of the casing reaches the threshold value.

5. The battery cell according to claim 1, wherein the protective part comprises a main body portion and a first connecting portion and a second connecting portion which are located on two sides of the main body portion along a width direction of the groove; the main body portion is accommodated in the groove and is configured to connect groove walls of the groove; the first connecting portion is used to connect the first portion, and the second connecting portion is used to connect the second portion.

6. The battery cell according to claim 1, wherein a melting point of the protective part is lower than the melting point of the pressure-relief mechanism.

7. The battery cell according to claim 6, wherein the protective part comprises at least one of a polypropylene membrane layer, a polyethylene membrane layer and a paraffin membrane layer.

8. The battery cell according to claim 1, wherein the protective part comprises a basal layer and a binding layer which are provided in a laminated way, wherein the binding layer is configured to connect the basal layer and the pressure-relief mechanism, and the binding layer is configured to switch from a viscous state into a non-viscous state when internal pressure of the casing reaches the threshold value.

9. The battery cell according to claim 1, wherein the protective part covers the groove along the width direction of the groove, and the protective part is respectively connected to the first portion and the second portion along the width direction of the groove.

10. The battery cell according to claim 1, wherein the weak portion is of an annular structure, the first portion is located in an area surrounded by the weak portion and is configured to turn after the weak portion is broken, and the second portion is located between the weak portion and the wall portion, and is configured to connect the wall portion; or, the weak portion is of a strip structure, and the first portion and the second portion are both used to connect the wall portion.

11. The battery cell according to claim 10, wherein the protective part has two or more protective units, wherein the two or more protective units are distributed at an interval on an extending trajectory of the weak portion.

12. The battery cell according to claim 10, wherein the protective part completely covers the weak portion along the extending trajectory of the weak portion.

13. The battery cell according to claim 1, wherein the casing has a casing body and an end cap, wherein the casing body has an opening, the end cap is configured to seal the opening, and either the casing body or the end cap has the wall portion.

14. The battery cell according to claim 1, wherein the wall portion has a through-hole, the pressure-relief mechanism covers the through-hole, and the second portion is connected to an inner wall surface of the wall portion.

15. A battery, comprising the battery cell according to claim 1.

16. An electrical device, comprising the battery according to claim 15, wherein the battery is configured to supply electricity.

17. A method for manufacturing battery cells, comprising:

providing an end cap and a casing body, the casing body having an opening, the end cap configured to seal the opening, either the casing body or the end cap being provided with a pressure-relief mechanism, the pressure-relief mechanism comprising a weak portion and a first portion and a second portion disposed on two sides of the weak portion, the weak portion being configured to connect the first portion and the second portion, and the pressure-relief mechanism being configured to cause the weak portion to be broken to release pressure when the pressure in a unit formed by the casing body and the end cap reaches a threshold value;

providing a protective part arranged at the pressure-relief mechanism, the protective part being configured to connect the first portion and the second portion to increase strength of connection between the first portion and the second portion;

providing an electrode assembly, installing the electrode assembly in the casing body; and assembling the end cap and the casing body, attaching the end cap to the casing body and covering the opening, wherein the weak portion is formed by forming a groove on an outer surface of the pressure-relief mechanism, at least a part of the protective part is accommodated in the groove, the protective part is configured to connect groove walls of the groove.

18. The method for manufacturing battery cells according to claim 17, wherein providing the protective part arranged at the pressure-relief mechanism, the protective part being configured to connect the first portion and the second portion to increase strength of connection between the first portion and the second portion, comprises:

pasting the protective part in an area, with the weak portion, of the end cap or the casing body, the protective part comprising at least one of a polypropylene membrane layer and a polyethylene membrane layer;

spraying protective powder onto the area, with the weak portion, of the end cap or the casing body and allowing the protective powder to cure to form the protective part, the protective powder comprising at least one of the polypropylene powder and the polyethylene powder; or soaking the area, with the weak portion, of the end cap or the casing body in a paraffin solution and allowing the paraffin solution on the area with the weak portion to cure to form the protective part.

19. The method for manufacturing battery cells according to claim 17, wherein a thickness of the first portion and a thickness of the second portion are respectively greater than a thickness of the weak portion.

20. The method for manufacturing battery cells according to claim 17, wherein the protective part is further configured to switch from a cured state into a softened state or to switch from the cured state into a melting state when the internal pressure of the casing reaches the threshold value.

\* \* \* \* \*